United States Patent

Tutelman

[15] 3,670,308

[45] June 13, 1972

[54] DISTRIBUTED LOGIC MEMORY CELL FOR PARALLEL CELLULAR-LOGIC PROCESSOR

[72] Inventor: David Morris Tutelman, Eatontown, N.J.

[73] Assignee: Bell Telephone Laboratories, Incorporated, Murray Hill, Berkeley Heights, N.J.

[22] Filed: Dec. 24, 1970

[21] Appl. No.: 101,311

[52] U.S. Cl. ....................................340/172.5
[51] Int. Cl. ....................................G06f 13/00, G06f 15/16
[58] Field of Search ....................................340/172.5

[56] References Cited

UNITED STATES PATENTS

| | | | |
|---|---|---|---|
| 3,106,698 | 10/1963 | Unger | 340/172.5 |
| 3,287,703 | 11/1966 | Slotnick | 340/172.5 |
| 3,312,943 | 4/1967 | McKindles et al. | 340/172.5 |
| 3,320,594 | 5/1967 | Davies | 340/172.5 |
| 3,391,390 | 7/1968 | Crane et al. | 340/172.5 |
| 3,395,393 | 7/1968 | Githens | 340/172.5 |
| 3,473,160 | 10/1969 | Wahlstrom | 340/172.5 |
| 3,537,074 | 10/1970 | Stokes et al | 340/172.5 |
| 3,579,201 | 5/1971 | Langley | 340/172.5 |

OTHER PUBLICATIONS

IBM Technical Disclosure Bulletin, Vol. 6, No. 1, June 1963 pages 82- 84, " Data Flow Control System" by Meade et al.

*Primary Examiner*—Paul J. Henon
*Assistant Examiner*—Paul R. Woods
*Attorney*—R. J. Guenther and Kenneth B. Hamlin

[57] ABSTRACT

In a parallel cellular logic processor including a program control unit and a plurality of logic memory cells, all data inputs, except intercell inputs, for any cell are channeled through common input coupling logic to a one-bit intracell bus. The coupling logic is enabled or disabled in accordance with predetermined combinations of states of program control signals and of a plurality of control flip-flop circuits within the cell. Those flip-flop circuits receive data signal inputs from the bus. The same bus also provides data inputs for a data flip-flop circuit and for a data store within the cell. Data input to the bus is provided by way of the coupling logic from a program-selected one of the data flip-flop circuit, the store, an external source, or from program. Additional logic allows communication among cells by way of selective interconnection of their respective intracell buses as determined by further program control signals.

21 Claims, 6 Drawing Figures

FIG. 1
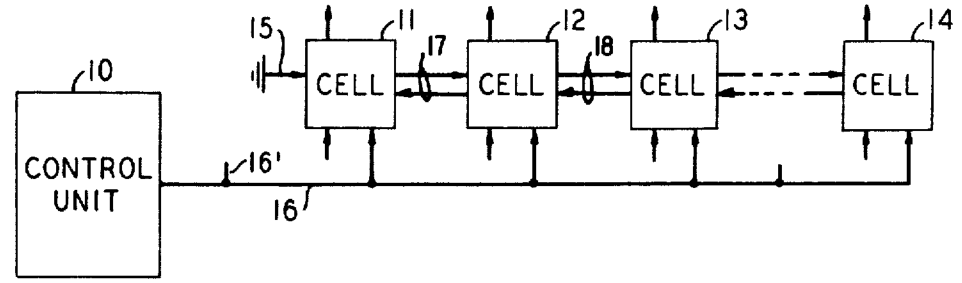
FIG. 2
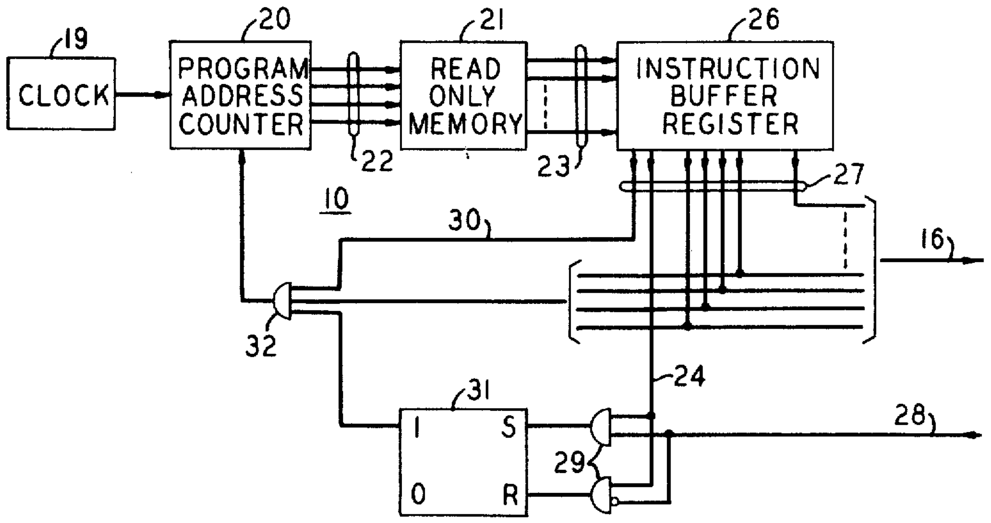
FIG. 3
| ADDR | CONDITION | SOURCES | DESTINATION | GLOBAL | GATING | BRANCH | READ |
|---|---|---|---|---|---|---|---|
| (4) | (3) | (4) | (6) | (2) | (2) | (1) | (1) |
INVENTOR
D. M. TUTELMAN
BY Charles Scott Phelan
ATTORNEY

DISTRIBUTED LOGIC MEMORY CELL FOR PARALLEL CELLULAR-LOGIC PROCESSOR

BACKGROUND OF THE INVENTION

1. Field of the Invention

This invention relates to data processing systems. It relates more particularly to such systems of the distributed logic memory type, i.e., systems wherein a plurality of identical data processing operations are simultaneously carried out in different processing word, bit position, processing circuits, each having a multibit data store associated therewith.

2. Description of the Prior Art

Distributed logic memory systems, i.e., parallel cellular logic processors, have been known in the art for many years and have the advantage of being capable of performing complex computations extremely rapidly because they can perform many sets of similar operations at one time on plural bit groups of program-directed group size. One example of a parallel cellular logic system is that shown in the B. A. Crane and J. A. Githens U.S. Pat. No. 3,391,390 entitled "Information Storage and Processing System Utilizing Associative Memory." Such systems are distinct from single processor systems wherein a given operation is performed by simultaneously processing all bits of a single word of a given size at one time. However, operation in single processor systems is limited to a single word and a single operation type at one time. If a group of words are to be subjected to the same sequence of operations, they must be operated upon one at a time in a single processor system rather than simultaneously as in a parallel cellular logic processor using distributed logic memory cells. Parallel cellular logic processing systems are also distinct from multiprocessor systems wherein a plurality of processors with either a common memory or distinct memories are operated in coordination to perform simultaneously different discrete operations of the same or different types on completely different processing words. Each processor in a multiprocessor system has a fixed maximum word size, but in a parallel cellular logic processing system the sizes of plural bit groups to be simultaneously but separately processed in the same way are program controlled to different arrangements for different functions.

Some difficulty has been experienced in adapting parallel cellular logic processing systems to large scale integration manufacturing techniques which have recently been developed to facilitate more economical production of complex circuits. The difficulty arises in one respect because distributed logic memory cells have heretofore generally been of complex design with a comparatively high logic gate count. Consequently, such a cell requires a relatively large semiconductor area in a large scale integrated circuit system. It also requires a corresponding multitude of circuit crossovers at which the circuit connections must intersect without electrical interconnection to one another. Large scale integration has been also difficult in another respect in that the distributed logic memory cells have generally required operation in association with a computer-type control unit of extensive computational capability and cost. One alternative which has been considered in the past is to include program-generating capability in the cells, but this makes the cells so complex that they become much less attractive for large scale integration. Both of the foregoing factors work against the use of large scale integration of parallel cellular logic processing systems for special purpose machines in fields in which the machine unit volume manufactured may be relatively small due to the need for frequent redesign to improve capabilities for meeting competitive pressures.

It is thus one object of the present invention to improve parallel cellular logic processing systems.

It is another object to increase data processing flexibility of distributed logic memory cells so that they may be economically employed for different system applications in order to generate an economical production volume for large scale integration.

A further object of the invention is to reduce the gate count, and thereby tend to reduce the silicon area used, in distributed logic memory cells.

SUMMARY OF THE INVENTION

The foregoing objects and additional objects and advantages of the present invention are realized in one illustrative embodiment in which each cell of a parallel cellular logic processing system includes plural, bistable, switching devices which are actuatable in response to coincident energization by a control signal from a system control unit and by a data signal from an intracell data bus for that cell. The bus is common to input connections of all of such switching devices. Data input signals for that cell are channeled to the intracell bus through common coupling logic which is enabled or disabled in accordance with predetermined combinations of states of program control signals from the control unit and of states of output signals from the bistable switching devices or external inputs.

It is one feature of the invention that one or more of the bistable devices with access to the intracell bus is a control bistable device that is employed under program control to enable or disable individual cell functioning for selected operations.

A related feature is that control signals utilized to enable activation of each bistable device and the common coupling logic are independently program specified so that the signal and device can be utilized in connection with plural types of microinstruction operations, rather than each being dedicated to a specific microinstruction function.

It is another feature of the invention that the cell common coupling logic includes circuits for receiving data signals from sources external to the processor, from a data store within each of the respective cells, and from a data bistable switching device within each of the cells.

A further feature is that the data store and the data bistable switching device are actuatable by data signals appearing on the intracell data bus.

Yet another feature of the invention is that intracell data buses of individual cells are selectively connectible, in response to program control signals, in signal coupling tandem relationship in differently sized groups of cells.

A still further feature of the invention is that gates selectively actuatable by program control signals are provided for registering in the data bistable device of each cell an information signal state which is coupled to that cell from another cell.

BRIEF DESCRIPTION OF THE DRAWING

A complete understanding of the nature and operation of the invention may be obtained from consideration of the following detailed description in conjunction with the appended claims and the attached drawing in which:

FIG. 1 is a simplified block and line diagram depicting a parallel cellular logic processing system;

FIG. 2 is a diagram partially in block and line form and partially in schematic form illustrating details of circuits advantageously included in the control unit of FIG. 1 for implementing the present invention;

FIG. 3 is a schematic representation of an instruction word stored in the memory of the control unit of FIG. 2;

DETAILED DESCRIPTION

Figure 4:
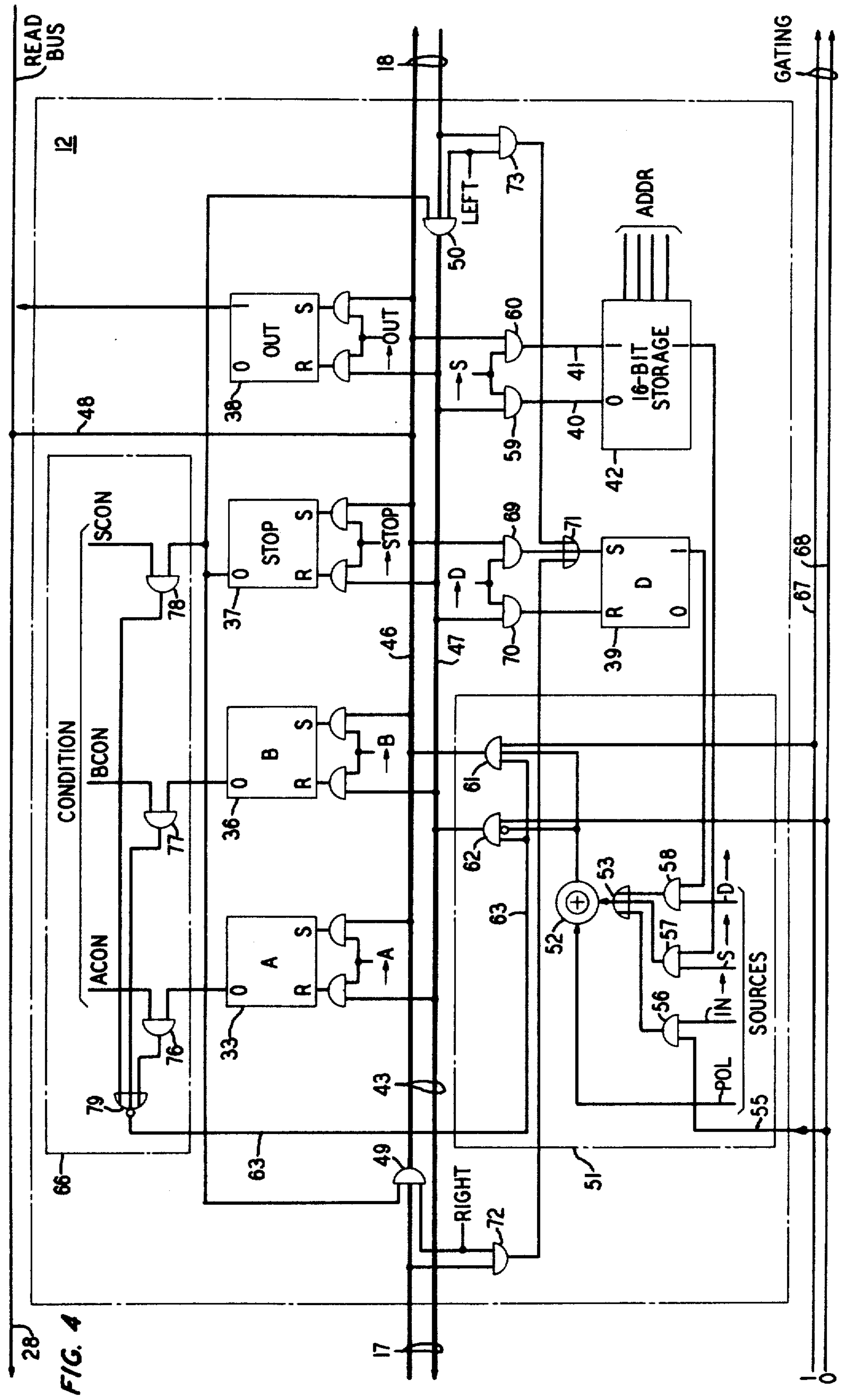
FIG. 4 is a schematic diagram of a distributed logic memory cell in accordance with the invention and useful in systems such as that depicted in FIG. 1.

In FIG. 1, the parallel cellular logic processing system shown includes a control unit 10 for coordinating the operation of a plurality of distributed logic memory cells by providing control signals thereto. In the figure, only four cells 11, 12, 13 and 14 are illustrated, and these cells receive control signals from the unit 10 by way of a multiconductor common control bus 16. Intercell connections 17 and 18 are provided to facilitate communication among the cells. A ground connection 15 on cell 11 operationally indicates the left-most cell and will be discussed in connection with FIG. 4. Each cell includes a data memory and associated logic circuits for operating upon data from the memory or from other sources in accordance with signals provided by the control unit 10. Computations are carried out in the system of FIG. 1 in parallel utilizing store, read, and compare types of basic operations. Such operations are known to allow a wide range of logical and arithmetic functions to be performed. In accordance with one aspect of the present invention, a plurality of processing words are considered, with each word having each of its bits stored in a corresponding location of the data stores of the respective cells.

Each of the cells has storage capacity for a plurality of bits from a corresponding plurality of different words; and for purposes of illustration, the present invention is described in terms of an embodiment in which sixteen processing words are employed so that each cell includes a 16-bit data store. The number of bits per word may be any number and, for example, might be several bits, several dozen bits, or many hundreds of bits, with all of the corresponding number of such cells being operated under the control of the one control unit 10. Although only one bus 16 is shown, a diagonal lead 16' schematically represents the fact that additional strings of cells can be driven on a fan-out basis from unit 10 through respective bus drivers, not shown, for all of the multiple buses. In a fan-out arrangement intercell connections advantageously extend also to cells on other buses to form a single large intercell string of all cells operated from unit 10, but this is not a limitation.

FIG. 2 shows in greater detail the structures included within control unit 10 for implementing a distributed logic memory cell operation in accordance with the present invention. In general, this control unit performs only program functions, and data functions are performed exclusively in the various distributed logic memory cells controlled by the unit 10. A clock 19 supplies regularly recurring signals for actuating a program address counter 20. Address signals developed by counter 20 identify program instruction word locations in a read-only memory 21 and are applied to that memory by access conductors 22. The counter 20 may, for example, be a ring counter with an output signal being coupled from each stage by a different one of the conductors 22 to actuate storage devices in corresponding memory word locations to provide readout signals. Alternatively, counter 20 may be a binary counter with output signals from its various stages being coupled by conductors 22 to an address translator included within the memory 21 for providing readout signals to the respective memory word locations in sequence.

Memory 21 is advantageously a semiconductor-type of memory structured for read-only operation. For example, a diode matrix connection is often employed for such memories and information is represented by the presence or absence of connecting crosspoints between matrix row and column circuits. Thus, an input signal on a selected row circuit causes an output signal to be produced on each column circuit connected to that row circuit by a diode. These output signals are applied by way of digit circuits 23 to an instruction buffer register 26. Word locations of memory 21 are thus interrogated in repetitive sequence by the counter 20 in order to cycle the processing system through a predetermined program. Usually different memory information patterns will be manufactured for the various types of system applications in which the processor is to be employed.

Digit readouts from memory 21 to the instruction buffer register 26 are advantageously successive microinstructions of a program in machine-usable form. Such program information is usually provided initially in a higher type of program language by a programmer who then causes the program to be converted to machine-usable form by a compiler which is suitable for the program language which is to be employed. The compiler output is employed to control the information pattern formed in memory 21. The principal discussion in the present application is hereinafter presented in the terms of machine-usable notation stored in memory 21 since the manufacture of read-only memories is well known in the art and comprises no part of the present invention.

Outputs from register 26 appear on individual conductors 27 of the common control bus 16 which applies those signals to the distributed logic memory cells in parallel. Program branching can be realized as a function of data results produced in the distributed logic memory cells by applying cell data output to a read circuit 28 in a manner which will be described. Signals on the circuit 28 are converted to double-rail logic format by a pair of coincidence gates 29 and applied to control the state of a bistable switching device, or flip-flop 31. A program controlled read bit in the output of register 26 is applied by a read circuit 24 to enable the gates 29 at the proper times. A program controlled branching bit in the output of register 26 is applied by a circuit 30 to cooperate with the binary ONE output of flip-flop 31 in the set state for enabling a plurality of coincidence gates, which are schematically represented by a single gate 32. Gate 32 is utilized for coupling address signals from the output of the register 26 to the program address counter 20 for overwriting the contents of that counter.

Thus, when a branching instruction is indicated by the branching bit, in coincidence with a predetermined signal state in the flip-flop 31, some instruction signals provided by register 26 are interpreted as signals defining an address in read-only memory 21 so that the program will skip to the new address location. The number of address bits required for memory 21 may be larger or smaller than the number required for the distributed logic memory cells. If larger, bit positions in register 26 normally used for cell control signals are employed for the memory address. The cells are kept inactive while actual address changing for branching is taking place by keeping certain cell control signal bits in an instruction in the ZERO, i.e., low voltage, condition. These bits include the gating, and global bit positions, to be described. Also, the READ bit position is kept in the ZERO state to prevent inadvertently resetting flip-flop 31 during a branch.

FIG. 3 depicts in diagrammatical form the various fields of an instruction word which is stored in memory 21 in accordance with one embodiment of a distributed logic memory cell of the present invention. As had already been suggested in connection with the description of FIG. 2, binary signal representations are included in the various bit locations of the fields in the word of FIG. 3. A binary ONE is represented by a predetermined signal voltage level which is higher than the signal voltage level representing a binary ZERO. A high voltage provides an enabling or actuating signal to a logic gate, such as AND, OR, NOR, or EXCLUSIVE OR logic gates, and provides actuating signals to bistable devices, i.e., flip-flop circuits. A low voltage signal causes enablement or actuation to be similarly withheld.

In FIG. 3 the address field includes four information bits which define one of the sixteen processing words of interest, i.e., one of the 16 bit positions in the data store of each of the distributed logic memory cells. The 3-bit condition field in the word provides signals which enable all cells to utilize the output signal condition of any one or more of three control flip-flop circuits in each cell. If the states of none of those flip-flops are of interest, all three bits in the condition field would be in the low voltage condition. Control signals in the 4-bit sources field allow the selection of any or none of four signal inputs in each of the cells.

The word of FIG. 3 includes a 6-bit destination field wherein the six control signals are available to allow the selection of any one or more, or none, of six possible outputs from an intracell bus to various cell circuits, as will be described in connection with FIG. 4. The 2-bit global field in the word indicates the type of communication among cells through the intercell connections. Since the cells are controlled in parallel by signals on a common control bus 16, they can, for purposes of description, be considered to be coupled in a line extending from left to right along that bus. Thus, the signals in the global field of the word indicate whether or not the selected cells are to communicate to or from the left, or to or from the right.

Two gating bits in the word format of FIG. 3 each can be set to either of the two binary states to control actuation of an intracell bus in various ways which will be described. The single branching bit in the word of FIG. 3 indicates whether or not the corresponding instruction word represents a branching instruction, and thus determines whether the signals in selected bit positions of the word will be coupled by way of the gate 32 to the program address counter. A single read bit in the word of FIG. 3 enables the establishment of flip-flop 31 in an appropriate cell-directed state prior to execution of a branching instruction.

FIG. 4 shows schematic details of the distributed logic memory cell 12. However, since all of the cells are of identical construction, the same schematic diagram applies for each of them. The only difference among cells is that in an intercell string connection the left-most cell lacks the intercell connections 17, while the right-most cell served by control unit 10 lacks the intercell connections 18. Subsequently it will be shown that for purposes of initialization of a system it is advantageous for the left-most cell in a string to use a logic circuit disabling connection, such as the ground connection 15 of FIG. 1 where ground is used as the disabling one of two binary signal conditions, in lieu of the upper one of the connections 17 in FIG. 4.

Each cell is served by the multiconductor common control bus 16 which includes 21 conductors corresponding respectively to all but two of the bit locations of the instruction word format indicated in FIG. 4. The two excepted bit locations are ones included in the branch and read fields of the word. Most of the 21 control conductors in the bus 16 are indicated in FIG. 4 in association with the field name shown in FIG. 3; but the six destination circuits and the two global circuits could not be conveniently so grouped without unnecessarily complicating the drawing. The two global control conductors are those designated LEFT and RIGHT in the center of the cell 12 in FIG. 4. Similarly, six destination control conductors are indicated near the center of FIG. 4; and each of these leads bears one of the designations →A, →B, → STOP, → OUT, → D, and → S. All destination control signals are utilized to enable set and reset input coincidence gates of bistable switching devices, such as the two general purpose control flip-flops 33 and 36, a stop control flip-flop 37, an output flip-flop 38, and a data flip-flop 39, as well as enabling input gates for actuating digit, writing, drive, input conductors 40 and 41 of a 16-bit data store 42. Data flip-flop 39 is sometimes known as a matching flip-flop because it is frequently utilized in that function.

A two-conductor intracell bus 43 includes conductors 46 and 47, respectively, for providing communcation among the various functional circuits of the cell 12. Three forms of cell output can be derived from the bus 43. Intercell output is provided to the right from conductor 46 through a circuit 18 and an intercell input gate, to be described, of an adjacent cell. Similarly, communication to the left is accomplished from the conductor 47 through one of the circuits 17 and another intercell gate, which will also be described, of an adjacent cell. Output from cell 12 to external equipment, which is otherwise independent of the distributed logic memory processing system, is achieved by coupling from conductors 46 and 47 through the OUT flip-flop 38. Such output coupling occurs when the → OUT control signal enables the set and reset gates of that flip-flop. A third form of output from cell 12 is continuously available in the form of a read circuit 48 which is connected from conductor 46 of the bus 43, in each cell, to the read circuit 28 that goes back to control unit 10 as previously described. Circuit 28 can, of course, also provide signals to equipment external to the processor. Although not specifically shown in FIG. 4, input connections to circuit 28 from cell circuits 28, and to conductors 46 and 47 from other circuits, are advantageously accomplished through OR gates to reduce chances for coupling among such inputs.

Two forms of data input to the cell 12 are available. One of these forms is the one provided through intercell connections 17 and 18. Thus, conductor 46 of intracell bus 43 receives signals from cells to the left by way of a connection 17 and a coincidence gate 49 which is partially enabled by the RIGHT control signal. Similarly, intercell communication signals are received from cells to the right by way of a connection 18 and a coincidence gate 50 which is partially enabled by the control signal LEFT. Gates 49 and 50 are both enabled or disabled simultaneously by the binary ZERO output of STOP flip-flop 37. A second form of input signal coupling is provided by way of coupling logic 51 which is program controlled for selecting no more than one data input signal source at one time. The control signals for exercising this selection are the three sources field signals IN→ , S→ , and D→ . A fourth sources field control signal is a POL signal which is provided to the coupling logic 51 for a purpose to be described. Likewise the two gating field signals are supplied through logic 51.

The logic 51 can perform several functions in addition to that of selecting a particular data signal source. Thus, it can accomplish a program controlled enabling or disabling of the entire coupling logic 51. It can couple signals from a selected source to the intracell bus 43 in a double-rail logic format to both bus conductors, or in a single-rail logic format to a selectable one of the two bus conductors. Logic 51 is also capable of so coupling source signals to the bus in either the true signal format or the complemented signal format. Also, coupling logic 51 can be controllably operated by program control signals to cooperate with the data store 42 for performing data signal matches for accomplishing the compare-type of computations previously mentioned.

A single EXCLUSIVE OR logic gate 52 is included in the coupling logic 51. One input of gate 52 is provided by the POL, sources field, control lead. A POL signal in the binary ONE, high voltage, state causes gate 52 to complement data signals that are applied to the other input connection thereof, while a binary ZERO, low voltage, signal on the POL control lead causes gate 52 to couple signals at its other input connection in the true form. The aforementioned other input connection of gate 52 receives data signals from the output of an OR gate 53 which combines outputs of three program controlled coincidence selection gates 56, 57, and 58. The latter gates are enabled by the control signals IN → , S→ , and D→ , respectively, when any of such signals is in the high voltage condition.

The IN → control signal allows single-rail logic data to be coupled in from any appropriate source external to the processor by way of a lead 55. In similar manner, the S → control signal enables gate 57 to couple the binary ONE digit circuit output of data store 42 for utilization in the logic 51. A D → control signal allows the binary ONE output of the data flip-flop 39 to be coupled into the coupling logic circuit 51 for indicating the result of a previous matching operation or for indicating another data condition, as will be described.

Store 42 is any random access store having bit locations which are addressably actuatable for writing or reading data in the store. A semiconductor memory is advantageously employed with 16 bit locations and appropriate address translating logic associated in the same schematic representation. A 4-bit address signal provided on control leads ADDR from the address field of an instruction word identifies a particular data store bit location, and couples the input-output terminals of that storage location to store digit circuits common to all sixteen locations. The information state of that addressed storage location is read out to the digit read circuit in response to the ADDR signals and is utilized if an S → control signal is provided in coincidence with the ADDR signals. On the other hand, data information is written into the addressed data store location when the → S control signal is provided to allow input of data in coincidence with the ADDR address signals. That control signal enables gates 59 and 60 to apply signal conditions from the intracell bus 43 to the digit writing drive circuits 40 and 41 of the data store 42.

The output of EXCLUSIVE OR gate 52 is applied in true form to a coincidence gate 61, and it is also applied to a further coincidence gate 62 in inverted form, as indicated by the circular schematic notation for an inhibiting input connection at the input of gate 62 to which the output of gate 52 is applied. Gates 61 and 62 have their outputs connected to conductors 46 and 47, respectively, of the intracell bus 43. Both of the gates 61 and 62 must be enabled by a high signal on an enabling lead 63 from enabling logic 66, which will be subsequently described.

One or both of the gates 61 and 62 may be further enabled by program control exercised through control signals in the gating field of an instruction word. These are the control signals applied on a binary ONE circuit 67 and a binary ZERO circuit 68 of the common control bus 16. When control signals on both of the circuits 67 and 68 are high, gates 61 and 62 are enabled for coupling the single-rail logic output of gate 52 to the intracell bus 43 in double-rail logic form. If either of the control circuits 67 and 68 is high while the other is low, the output of EXCLUSIVE OR gate 52 is coupled to the cell bus 43 in single-rail logic form, which is either true or complement depending upon which of the gates 61 or 62 is enabled. The true form goes from gate 61 to bus conductor 46, and the complement form is applied from gate 62 to bus conductor 47. It will thus be seen that, by appropriately employing the POL control signal to gate 52 and the gating control signals to gates 61 and 62, various forms of operations can be performed in which the contents of the data flip-flop 39 or data store 42 are compared to a program specified data format.

It is not possible with this input coupling logic 51 to match directly signals provided by any two of the input coupling gates 56, 57, or 58. However, such a match can be indirectly performed by using one input signal for preconditioning the state of data flip-flop 39, and then applying another input signal to the flip-flop 39. A subsequent control operation performed on the output of the flip-flop determines whether or not the state of the flip-flop changed after the preconditioning and thus determines whether or not there was a mismatch of data signals from the different input sources employed. Illustrative examples of the matching and other operations will subsequently be outlined.

Gates 69 and 70 couple the bus 43 signals for utilization by the data, or D, flip-flop 39 in response to the → D control signal. Gate 70 directly couples the bus conductor 47 to the reset input connection of match flip-flop 39. However, the set input of the flip-flop is coupled to bus conductor 46 through the coincidence gate 69 and an OR gate 71. The latter gate also receives at two additional input connections thereof signals from intercell circuits 17 and 18 by way of a coincidence gate 72 for bus conductor 46 from the cell to the left of cell 12 and from bus conductor 47 by way of a coincidence gate 73 for a cell to the right of cell 12. The global control signals RIGHT and LEFT enable gates 72 and 73 whenever one of those signals is high for also enabling one of the intercell coupling gates 49 and 50, respectively, for intercell communication from left to right or from right to left, respectively. Thus the global control signals allow propagation to the left or to the right of whatever signal condition prevails on the intracell bus of a sending cell. The propagation extends in the direction indicated by the enabled one of the gates 49 or 50 until a cell is reached, wherein the stop flip-flop 37 is in the set condition, so that its binary ZERO output is producing a low voltage which withholds enablement from the intercell propagating gates 49 and 50 of that cell.

The signal operations that can be performed by a cell, such as the cell 12 in FIG. 4, depend upon the operation of the common coupling logic 51 for all cell data inputs other than intercell inputs. In particular, inputs to bus 43 from logic 51 depend upon the use of the two coincidence coupling gates 61 and 62 through which all input data other than intercell data must flow in order to reach the intracell bus 43. Gates 61 and 62 are controlled by the enabling logic 66. Three AND gates 76, 77, and 78 are included in the latter logic and receive the program controlled condition field signals ACON, BCON, and SCON, respectively. These same coincidence gates also receive the binary ZERO outputs of the three control flip-flop circuits A, B, and STOP, which are otherwise designated 33, 36, and 37, respectively. Outputs of three gates 76 through 78 are coupled through a NOR gate 79 to the enabling lead 63 which supplies a single enabling control signal to the coupling gates 61 and 62.

In the absence of a condition field control signal, all three of the gates 76 through 78 receive low voltage signals from the common control bus 16 and are disabled so that they also provide low voltage signals to the NOR gate 79. Consequently, gate 79 provides a high voltage signal to the enabling lead 63 for enabling gates 61 and 62. Thus, it will be seen that those two coupling gates are normally partially enabled by the high voltage enabling signal on lead 63 in all cells in the absence of condition field control signals. If any one or more of the condition field control signals is high, its corresponding AND gate in the enabling logic 66 is partially enabled in every cell. In any cell in which the corresponding control flip-flop is in the reset state, such AND gate is fully enabled and provides a high voltage output signal to NOR gate 79 to cause that gate to reduce the voltage on enabling lead 63 for thereby disabling coupling gates 61 and 62. However, if the control flip-flop corresponding to an activated condition field control lead is set in any cell, the low voltage reset output of that flip-flop disables its corresponding coincidence gate in the enabling logic 66 so that the high voltage enabling signal on lead 63 is undisturbed in that cell.

Thus, if a condition control signal is high, it disables the coupling logic 51 in every cell except those cells where the corresponding one of the three control flip-flops 33, 36, or 37 is set. Stated differently, if any one of the condition control signals is high, no cell can be active unless the corresponding one of its control flip-flop circuits is also in the set condition. Thus, any desired pattern of cells in the full string of cells coupled to common control bus 16 can be selected for the performance of a particular function by presetting the state of one or more of the control flip-flops in each cell of the pattern and then providing a high voltage control signal on the corresponding condition field control signal circuits. Since plural control flip-flops are advantageously provided in the cells, different patterns of cells for different functions can overlap one another.

Various types of logic circuits, such as AND, OR, NOR, EXCLUSIVE OR, and flip-flop circuits have hereinbefore been mentioned. Many forms of such circuits are available in the art for providing the functions herein indicated. However, when the invention is applied to an integrated circuit system it is usually preferred that logic circuits without specific circuit capacitance and without specific circuit inductance, i.e., as distinguished from distributed circuit capacitance or inductance, be utilized in order to facilitate equipment manufacture. Schematic representations of the various logic circuits indicated are to be understood to include appropriate power supply connections not otherwise shown in the drawing.

The various advantages of a distributed logic memory cell of the type hereinbefore described may be more readily appreciated upon a consideration of several program routines. These include the fundamental routines of machine operation such as store, read, and compare operations, as well as including routines for arithmetic operations such as addition, subtraction, and shifting. By employing such basic program routines, many logical and arithmetic operations known in the art can be performed. Illustrative program routines are hereinafter described and listed in a notation format which indicates the nature of signal states in fields of register 26 outputs (FIG. 2) which have control circuits which are applied to the distributed logic memory cells by way of the bus 16. This notation scheme represents the instruction information which is stored in the read-only memory 21 in machine-usable form and which is schematically represented by various combinations of binary ONE and ZERO signals.

The notation characters such as $S_0, S_1, \ldots S_n$ indicate various bit location addresses in data store 42 (FIG. 4) wherein $n$ is 16 for the illustrative embodiment described herein. The appearance of any such address character will hereinafter be understood to represent an appropriate distinctive combination of binary ONES and ZEROS in the address field to define one of the bit addresses. The definition of such an address for a bit is necessarily the same for all cells coupled to common control bus 16 since that bus serves all of the cells in parallel.

Other control leads in the common control bus 16 are all understood to be in the low voltage, or binary ZERO, state unless a notation character is provided to indicate that a particular lead is in the high voltage state. Thus, a character such as — CON represents a condition field lead that is high, and the specific one of such leads will be indicated by an appropriate letter in the blank space. Similarly, __ → indicates a sources field lead that is high, → __ indicates a destination field lead that is high, L or R indicates a corresponding global field lead that is high, and 1 or 0 indicates a gating field lead that is high. Since notation characters are distinctive for each field, and since the signals of an instruction are in fact applied simultaneously, the sequence of characters in the notation format is of no significance in the current presentation.

Before meaningful data processing operations can begin it is necessary to establish in the distributed logic memory cells a distinctive pattern of signal conditions for those cases wherein some operations will be performed on fewer than all of the cells of a string. Such initialization is achieved by placing signal patterns in data stores or in control, or other, bistable devices in the cells. The patterns are supplied in either of two ways, by external register or by program. Both will be explained, but in many systems the latter technique will generally be used because it more closely associates the initial information with the job to be performed and thereby reduces chances for error.

Assume first that appropriate ones of the control flip-flops of the selected cells are to be set to initialize the processing system. An external register, not shown, may advantageously be employed for applying binary ONES to the external input leads 55 of all cells which are to be selected. Now an instruction notation such as IN → , 1, → A is used to indicate that the particular control leads in the sources, gating, and destination fields, respectively, are high, while all other control leads are low. Such an instruction sets the A flip-flop 33 of all cells having a binary ONE input at the lead 55 to gate 56. The absence of the POL signal means that the binary ONE condition is coupled in true form as far as the output of EXCLUSIVE OR gate 52. This signal is then coupled through only gate 61, because only the "1" gating field signal is high, to the intracell bus conductor 46. Since the → A control signal is high, the high signal on conductor 46 causes only the A flip-flop 33 to be set.

Additional destination control signals can be provided in the same instruction to set other circuits in the same cells at the same time if such should be desired. However, if other control flip-flops are to be set individually in a different pattern of cells, then an additional instruction similar to that just specified must be executed for each pattern with the appropriate destination control signal indicated. It will now be appreciated that a similar instruction can also be used for transferring data from an external register to the data store 42 by employing the → S destination field signal.

Initialization by program requires that the program sequence in memory 21 of FIG. 1 include an initialization microinstruction sequence. Such sequence is skipped for all program cycles except the first one by use of the branch field bit. A sequence of programmed initializing steps will be outlined here although some of the steps will not be explained in detail until later.

First, all A flip-flops 33 and all STOP flip-flops 37 are set, e.g., by an instruction POL, → STOP, 1. Then all D flip-flops 39 are reset by → D, 0. Now a binary one from the gating field is propagated to the right from all cells, and that operation sets all D flip-flops 39 except the one in the left-most cell, cell 11, which, as the left-most cell of the string, has the ground connection 15 at inputs to its gates 49 and 72 in lieu of a circuit 17 input. Contents of all D flip-flops 39 are now, by an instruction D → , → A, 1, 0, POL, inverted and stored in respective A flip-flops so that the left-most A flip-flop is now set and all others are reset. By a series of storing operations using the sources field signal POL and the two gating field signals, while holding ACON in the ONE state, the preprogrammed initial data is now stored in the bit locations of the first cell 11. For example storing instructions for each $i^{th}$ bit location would be POL, 1, 0, → S, ADDR=$S_i$ to write a ONE. Omitting the POL character causes a ZERO to be written.

The A-active state in the programmed initialization is then propagated to the right to cell 12 by resetting all D flip-flops (0, → D), propagating the A flip-flop contents of cell 11 to the right to the D flip-flop in cell 12 (propagation stops at cell 12 because all STOP flip-flops were initially set), transferring the contents of all D flip-flops to the A control flip-flop on a double-rail basis (only cell 12 is now A-active because it was the only one with a D flip-flop set), and performing another series of storing operations for cell 12. By repeating the last series of operations, beginning with propagation to the right of the A-active state, once for each cell, preprogrammed initializing data is stored in all data stores in the sequence of cells along the intercell string.

It will now be understood that one or more of the words stored, with a bit, e.g., location $S_3$, in each cell, may represent a bit pattern corresponding to the pattern of cells which is to have a certain control flip-flop set. Where that is the case, the pattern is read out of the data stores. The read instruction employed for utilizing that bit pattern, instead of an external register, to set the control flip-flops, e.g., the B flip-flops, would be of the form ADDR = $S_3$, S → , 1, 0, → B.

It is also possible to store data from other sources such as the data flip-flop 39 or program. For example, any of the following instructions could be used to write data into the $S_7$ bit location of every cell having its A flip-flop set:

0, ACON( → S, ADDR = $S_7$ (a ZERO from program)

D → ,1,0, ACON, → S, ADDR = $S_7$ (data contents from D).

The complement of the output signal condition of the data flip-flop would be stored by adding to the latter instruction the character POL so that the POL lead would be high and the output of EXCLUSIVE OR gate 52 would be the complement of the input to that gate from OR gate 53.

It has been mentioned that signal states can be propagated to the left or to the right, between cells. This is sometimes expressed as a mark left or a mark right operation if a flip-flop is to be set in a receiving cell. Alternatively it is expressed as a shift operation where data is to move in an arithmetic shift from cell to cell. Signal propagation is accomplished by coupling an appropriate data signal source, e.g., the storage 42, through coupling logic 51 to intracell bus 43 in the sending cell or cells which will have been previously marked by setting one of the control flip-flops 33 or 36. Similarly, propagation is terminated at the first cell encountered with a previously reset STOP flip-flop 37. A global field control signal is provided in the instruction to specify the direction of propagation. Thus, assuming that appropriate instructions have been executed for setting the A flip-flop of a sending cell and the STOP flip-flop of the ending cell in each propagation sequence, instructions such as the following cause the actual propagation to take place in the indicated directions:

O, ACON, LEFT (propagate high signal to left from all A-active cells)

ACON, S → , RIGHT, ADDR = $i$, 1 (propagate high signal to right from all A-active cells in which bit $i$ of store 42 is a ONE).

Contents of a particular bit location of a data store are similarly propagated by first resetting all D flip-flops, making each sending cell active, e.g., A-active and setting the STOP flip-flop of each propagation ending cell. Then ADDR = $S_i$, ACON, S → , RIGHT, 1 initiates the propagation; and all intermediate cells and the ending cell have their D flip-flops established in the binary state of the sending location $S_i$ in the data stores of the respective sending cells. If all receiving cells are B-active, their D flip-flop contents are transferred to $S_i$ by ADDR = $S_i$, BCON, D → , → S, 1, 0. If it is desired to store the propagated data only at the ending cell of each propagation sequence, the condition field character is SCON instead of BCON.

Many operations require a matching function to be performed over one or more bit locations in at least one data store. These operations are accomplished for the present invention by presetting the data flip-flop 39 (now used as a matching flip-flop) to a predetermined reference state, reading the appropriate location of store 42 into the data flip-flop 39, and using the outputs of that flip-flop to indicate match for one state and mismatch for the other state, it being the programmer's option which state will be used to indicate match or mismatch. An illustrative instruction listing follows for matching the contents of locations $S_3$–$S_5$ of store 42 in B-active cells to determine whether or not they contain the binary bits 1, 1, 0, respectively.

| | |
|---|---|
| 1. The data flip-flop is present from program to a reference stable state, i.e., set to binary ONE state. | BCON, POL, 1, → D |
| 2. Read, in | ADDR = $S_3$, BCON, S → , 0,→ D |
| sequence, to the data flip- | ADDR = $S_4$, BCON, S → , 0,→ D |
| flop 39 from data store | ADDR = $S_5$, BCON, POL, S → , O, → D |
| locations which are to be matched. | |

If the data flip-flop of any particular B-active cell remains in the ONE state after the foregoing routine, it is known that its bits $S_3$–$S_5$ matched the specified data. If the data flip-flop had been reset during the routine, it is known that there was a mismatch for that cell. Various program objectives can now be realized by using the data flip-flop outputs in other circuits of the cell, e.g., to control the state of a control flip-flop such as flip-flop 33.

There are occasions in data processing systems of the distributed memory logic type when it is convenient to dedicate a plurality of storage locations in at least one cell to serve as a counter. Since these storage locations are not interconnected with one another, except in the sense that they all share a common digit circuit for reading and writing, it is necessary to increment such a counter by program. This is accomplished by reading the counter bit in the storage location of lowest binary significance, inverting the bit, and placing it back in its original storage location in the inverted form. If it is found during the foregoing sequence that the bit was a binary ONE in the form in which it was read from the data store, the sequence is repeated with the counter bit location in the next higher order of significance. However, if it is found that the original form of the bit was a binary ZERO, the incrementing sequence is halted for every cell where such a finding was made. The following instruction sequence illustrates the incrementing operation for the case where all cells which include counters are assumed to have been established in some common activity condition, e.g., S-active; and it is further assumed that the $S_0$ location in each cell is the counter stage of lowest order of significance:

| | |
|---|---|
| 1. Set the STOP flip-flops. | SCON, → STOP, 1 |
| 2. Read low order counter bit into D flip-flop. | ADDR = $S_0$, SCON, S → , 1, 0, → D |
| 3. Return contents of D flip-flop to original location in data store but in inverted form. | ADDR = $S_0$, SCON, POL, D → , 1, 0, → S |
| 4. Utilize contents of D flip-flop to reset STOP flip-flop if previous bit from store was a ZERO. | SCON, D → , O, → STOP |
| 5. Read counter bit location of next higher order of significance into D flip-flop. (This instruction will not affect any counter cell wherein the STOP flip-flop had been previously reset indicating incrementing completed.) | ADDR = $S_1$, SCON, S → , 1, 0, → D |

The foregoing incrementing program continues through all of the counter-dedicated data store bit locations since each of the cell counter may contain a different binary number, and thus each may achieve the incremented condition at a different stage of the program. Consequently, the program provided from read-only memory 21 in FIG. 2 runs through all of the bit locations and relies upon the control of the STOP flip-flop in each cell, with a counter to halt incrementing for that cell at the appropriate time.

One adding algorithm is herein described along with instructions for implementing the same in a processing system utilizing circuits of FIGS. 2 and 4 in a combination as shown in FIG. 1. The algorithm represents the operations of marking a first control flip-flop in cells containing carry-generating bits, marking a second control flip-flop in cells containing carry-absorbing bits, propagating carries to the left from carry-generating bits until a carry-absorbing bit location is reached, performing a binary addition ignoring carries, and then adding in the carries without generating new carries. An illustrative example follows wherein it is considered that the addend register in the $S_0$ locations, the augend register in the $S_1$ locations, and sum register in the $S_2$ locations. Each extends through a full string of cells.

| | |
|---|---|
| 1. Mark all cells by setting both A and B control flip-flops. | POL, 1, → A, → B |
| 2. Allow only carry generators in $S_0$ and $S_1$ to remain A-active by clearing A in those cells lacking a binary ONE in either the addend or augend (a cell lacking a binary ONE in both $S_0$ and $S_1$ cannot generate a carry strictly within the cell bit position). | S → , → A, 0, ADDR = 0<br>S → , → A, 0, ADDR = 1 |
| 2. Allow only carry absorbers in $S_0$ and $S_1$ to remain B-active by clearing B in those cells that will pass a carry because either the addend or the augend is in the binary ONE state. (Now any cell which is no longer marked either A or B is a carry propagator because it has a single binary ONE.) | S → , → B, 0, POL, ADDR = 0<br>S → , → B, 0, POL, ADDR = 1 |
| 4. Mark left from A-active (carry-generator) cells, stopping at B-active (carry-absorber) cells. (This sets M flip-flop 39 in each intermediate cell that propagates a carry, and in the final B cell. Thus, all cells that will receive carries will now be marked by the setting of the M flip-flop.) | 0, → STOP, → M<br>BCON, 1, → STOP, POL<br>ACON, 0, LEFT |
| 5. Perform binary addition, ignoring carries, by storing a binary ZERO in the sum word $S_2$ for all | POL, 1, → S, ADDR = 2<br>ACON, 0, → A, ADDR = 2<br>BCON, 0, → S, ADDR = 2 |

| | |
|---|---|
| cells that are either A-active or B-active, i.e., cells that are either generators or absorbers, and a binary ONE in $S_2$ of all other cells. | |
| 6. Add in the previously marked carries without generating new carries, i.e., invert whatever binary state exists in the sum word $S_2$ for cells marked D to receive carries. (This is done by saving the state of the D flip-flop in the A control flip-flop, moving the $S_2$ bit into the D flip-flop, and then doing a "conditional store," i.e., storing the contents of D flip-flop 39 for A-active cells in the $S_2$ store location with sources field signal POL high to invert the data before storage. Now the $S_2$ register contains the true binary sum of $S_0$ and $S_1$.) | D→ , →A, 0, 1<br>S→ , →D, 0, 1, ADDR = 2<br>ACON, D→ , →S, POL, 0, 1, ADDR = 2 |

It was assumed in the foregoing listing for the adding operation that the registers containing the three numbers of interest extended throughout a full string of distributed logic memory cells. Separate adding operations can also be performed in parallel in two or more sets of registers within a single string of cells. One way in which it can be done is to utilize the STOP flip-flop and the SCON control signal wherever the B flip-flop and B control signal are employed in the foregoing listing. Then the cells containing register sets which are to be employed in parallel adding operations are made B-active, and each of the instructions in the foregoing adding listing has the BCON control signal character added thereto. Thus, cells that are not B-active are not affected by the adding routine.

The foregoing adding routine is also useful for performing subtraction. First, find the twos-complement of the register in the $S_1$ bit locations, i.e., the subtrahend register. This twos-complement is then placed in the $S_1$ location register, and the addition operation is carried forward as already outlined. The result of that addition is equal to the difference obtained by a more conventional subtraction operation. An advantageous algorithm for finding the twos-complement with the FIG. 4 cell comprises inverting in the register of interest all bits of higher orders of significance than the least significant binary ONE bit. An illustrative instruction listing is as follows:

| | |
|---|---|
| Mark cells to left of first ONE | |
| 1. Make all cells with $S_1$ ONE A-active. | ADDR = 1, S→ , →A, 0, 1 |
| 2. Reset D and STOP flip-flops. | 0, → D, → STOP |
| 3. Set the D flip-flop in all cells to the left of any A-active cell. | ACON, 0, LEFT |
| Invert $S_1$ in Marked Cells | |
| 4. Transfer contents of D flip-flop into a control flip-flop, thereby control-marking cells where $S_1$ is to be inverted. | D→ , →A, 0, 1 |
| 5. Read contents of $S_1$ into the D flip-flops. | ADDR = 1, S→ , →D, 0, 1 |
| 6. Return contents of D flip-flops in A-active cells to the original $S_1$ storage location but in inverted form. | ADDR = 1, ACON, D→ , → S, POL, 0, 1 |

If separate sets of registers are to be involved in parallel subtraction operations, boundary cells between adjacent registers are established by setting the STOP flip-flops therein to the binary ONE condition following the second step in the listing above wherein all STOP flip-flops were reset. Boundary cells are needed for subtraction because the operation of marking left must be confined within each register set.

Figure 5:
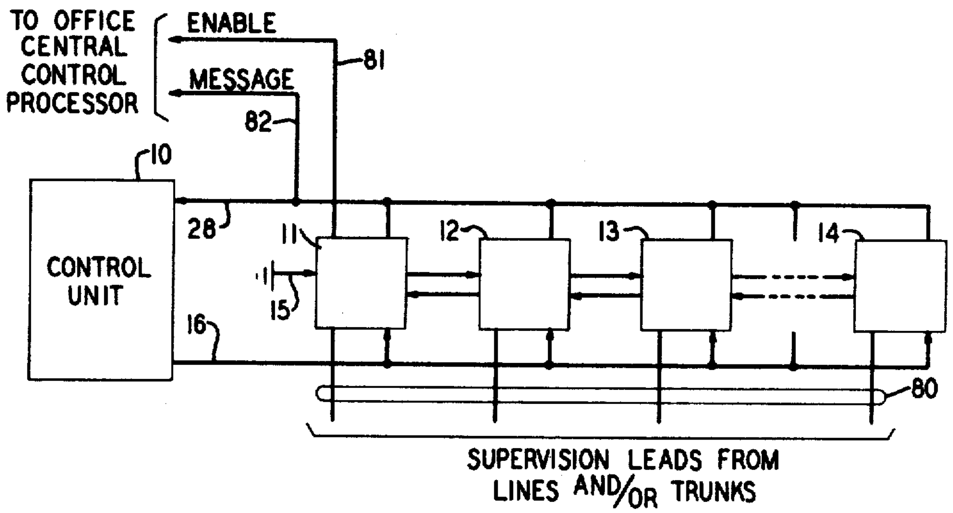
FIG. 5 is a block and line diagram for a line scanner employing the invention.

Having now covered adding, subtracting, and shifting operations, many other arithmetic operations can be performed by a processing system in accordance with the present invention by those skilled in the art. However, a nonarithmetic communication system application will be discussed to illustrate the utility of the invention in the nonarithmetic area also. This letter application is that of an autonomous scanner in an electronic communication system central office. Such a scanner observes signal conditions on supervisory leads extending from communication system circuits such as subscriber lines and/or interoffice trunks. An illustrative example is presented for the case of scanning leads indicating, in a telephone system, the on-hook condition as a binary ZERO and indicating the off-hook condition as a binary ONE. The scanner processor monitors circuit states and advises the office central control processor, not shown, when a change has occurred on one of the lines and also indicates the number of that line. FIG. 5 shows a simplified scanning processor portion of an electronic switching system block diagram.

Figure 6:
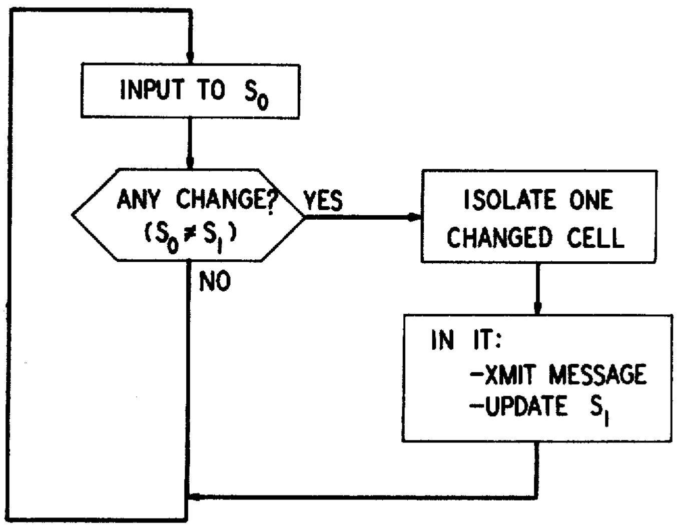
FIG. 6 is a flow chart of the scanner routine for FIG. 5.

FIG. 6 depicts a flow chart for the scanner processing routine. It assumes that all cells in a string served by the control unit 10 are employed in the scanning function. The bit locations $S_0$ contain the most recent input information from the supervisory lines 80; the locations $S_1$ contain indications of supervisory line conditions as they existed on the previous scan; and locations $S_2$ through $S_{11}$ contain 10-bit line numbers (assuming a 1024-line scanner) for the respective lines associated with the cells. The algorithm followed in the processing routine includes the major steps shown in FIG. 6 wherein supervisory line input conditions are sampled into the $S_0$ location of each cell from the supervisory leads 80. Next the conditions of these leads are tested against the contents of the $S_1$ bit locations in the respective cells to determine whether or not a change has taken place. If no change has taken place in a particular cell, the scanning routine is at an end in that cell for that cycle. However, if a change is found, one of the changed cells is isolated. Then for the isolated cell, an enable signal is transmitted to the office central control processor (on a circuit 81 connected to an OUT flip-flop binary ONE lead) advising that a change has taken place and there follows on a circuit 82 a message indicating the line number where the change was detected and what the new line state is. The contents of location $S_1$ are updated, the scanning routine is at an end for that cycle, and the scanner is ready for the beginning of a new scanning cycle. An illustrative listing for the scanner routine follows:

| | |
|---|---|
| Input to $S_0$ | |
| 1. Most recent signal state of supervisory leads 80 is stored in $S_0$. | ADDR = 0, IN→ , →S, 0, 1 |
| Mark cells for changed lines by set A if $S_0 \neq S_1$, else clear. | |
| 2. Transfer contents of $S_0$ to B control flip-flops. | ADDR = 0, S→ , →B, 0, 1 |
| 3. Transfer contents of $S_1$ to A control flip-flops. | ADDR = 1, S→ , →A, 0, 1 |
| 4. Invert contents of $S_1$ and apply to A control flip-flops only in cells where B control flip-flops have been previously set. (Effect is to set A or leave it set where the new and inverted old states are both ONE or both ZERO, respectively, —indicating a change—and to reset A or leave it reset elsewhere.) | ADDR = 1, BCON, POL, S→ , →A, 0,1 |
| Clear all but the left-most of the A-active cells. | |
| 5. Reset the D and STOP flip-flops on all | 0, → D, → STOP |

| | |
|---|---|
| cells. | |
| 6. Set the D flip-flops in all cells except the left-most cell in the A-active condition by marking to the right from A-active cells. | POL, ACON, 1, RIGHT |
| 7. Clear the A flip-flops in the marked cells, i.e., in all cells put the contents of the D flip-flops, twice inverted, into the reset side of the A control flip-flops. (This clears all A flip-flops except the left-most one, where D flip-flop had not been set.) | POL, D→ , →A, 0 |
| **Transmit Message from Single A-Active Cell that Remains** | |
| 8. Raise voltage of enabling lead 81. (This lead 81 can be connected to any one of the scanner cells; and, when in the high voltage state, it tells the central control processor that a scanner message may be forthcoming at this time from the read bus 28.) | POL, 1, → OUT |
| 9. Send status message to central control processor. (10-bit line number $S_2$–$S_{11}$ is sent first, and 1-bit signal $S_0$ indicating new supervisory state follows.) | ADDR = 2, ACON, S → , 1 (Similar instructions repeated for remainder of address locations $S_3$ through $S_{11}$ in succession.) ADDR = 0, ACON, S → , 1 |
| 10. Drop voltage of enabling lead 81. | 0, → OUT |
| **Update $S_1$ from $S_0$ in A-Active Cell** | |
| 11. Read contents of $S_0$ into D flip-flop. | ADDR = 0, S→ , →D, 0, 1 (This operation can be limited to the A-active cell by adding the character ACON, but the ultimate result is no different.) |
| 12. Store contents of D flip-flop in location $S_1$ if control flip-flop is A-active. | ADDR = 1, ACON, D → , →S, 0, 1 |

Assuming that the entire cell string is utilized for the scanning function and that no other functions are to be performed by the system of FIG. 1, the program would ultimately be recycled to the initial scanning instruction by the program address counter.

Although the present invention has been described in connection with particular applications and embodiments thereof, it is to be understood that modifications which will be obvious to those skilled in the art are included within the spirit and scope of the invention.

What is claimed is:

1. In combination,
a plurality of bistable switching devices,
a common circuit connection supplying signals to inputs of all of said devices in multiple,
a plurality of signal sources,
means selectively coupling at least one of said sources at a time to said connection,
means selectively enabling at least one of said devices for actuation in response to said signals,
a plurality of circuits for supplying different condition control signals, each of said control signals corresponding to a different one of said devices, and
selection means supplying on a single output connection a signal for disabling said coupling means in response to coincidence of one of said control signals and a first predetermined stable condition in its corresponding device.

2. The combination in accordance with claim 1 in which said sources comprise digital information storage means having individually addressable storage locations therein,
a data bistable switching device connected to be actuatable in response to said connection signals, and
an external input connection for supplying data signals to said common circuit connection.

3. The combination in accordance with claim 1 in which said coupling means comprises
an OR logic gate receiving inputs from said sources,
and EXCLUSIVE OR logic gate receiving as one input an output of said OR gate and receiving as a second input a binary control signal causing the output of said EXCLUSIVE OR gate to represent the output of said OR gate in true form or complement form depending on the state of said binary control signal,
controllable gating means coupling the output of said EXCLUSIVE OR gate to said common connection in double-rail logic form comprising both a single-rail true output of such gate and a single-rail complement output of such gate,
means selectively partially enabling outputs of said gating means for either the full double-rail form of said EXCLUSIVE OR gate output or either one of the constituent single-rail outputs thereof, and
means coupling said selection means single output connection for simultaneously partially enabling all outputs of said gating means in the absence of said disabling signal.

4. The combination in accordance with claim 1 in which
external coupling means are provided for coupling signals from said common circuit connection to an output which is otherwise independent of said system, and
means apply a control signal to actuate said external coupling means.

5. The combination in accordance with claim 1 in which each of said cells further comprises
data storage means including a plurality of independently addressable information bit storage locations, said storage means including digit circuits,
means receiving address signals for coupling addressed locations in each of said cells to said digit circuits thereof,
means coupling said digit circuits to receive signals from said common circuit connection to write information into an addressed storage location, and
means coupling a digit circuit to an input of said selective coupling means for reading out the information state of an addressed storage location of such cell.

6. The combination in accordance with claim 1 in which
said common connection includes means supplying said signals to inputs of at least two of said sources, and
said enabling means includes means enabling said two sources for actuation in response to said signals.

7. The combination in accordance with claim 1 in which
said coupling means includes means receiving a sources control signal identifying one of said sources and
said enabling means includes means receiving signal destination control signals identifying one of said devices, simultaneously with reception of said sources control signal in said coupling means.

8. The combination in accordance with claim 1 in which
said common circuit connection comprises first and second conductors,
said enabling means includes means coupling said first conductor to said devices for actuating such devices to a second predetermined stable state and means coupling said second conductor to said devices for actuating such devices to said first predetermined stable state, and
said common circuit connection further comprises a first gate coupled for applying external signals to said first conductor, a second gate coupled for applying external signals to said second conductor, and means coupling an output of one of said devices in said first predetermined state to enable simultaneously said first and second gates.

9. The combination in accordance with claim 8 in which at least one of said bistable switching devices has an output thereof comprising one of said sources, and means are provided coupling the output of said one device to an input of said selective coupling means.

10. The combination in accordance with claim 9 in which an OR gate is included in said means coupling said first conductor to said source bistable switching device, said OR gate having at least two additional input connections, and third and fourth gates are provided for coupling an input of each of said first and second gates, respectively, to said two additional input connections, respectively, of said OR gate.

11. The combination in accordance with claim 1 in which a plurality of said cells are provided, gating means are provided in each of said cells for interconnecting the common circuit connection of such cell in series with common circuit connections of adjacent cells to form a tandem sequence of common circuit connections of said cells, means are provided for coupling an output of a predetermined one of said bistable switching devices in at least a selected one of said cells in said first predetermined stable condition to enable said common circuit connection gating means.

12. The combination in accordance with claim 11 in which, a data bistable switching device is provided, additional gating means controllably couple inputs of said common circuit interconnecting gating means to set said data bistable switching device to a predetermined stable state, means supply control signals for selectively actuating said additional gating means to actuate said data bistable device in response to a signal from a cell to the left or to the right of such cell in said tandem sequence, and means couple an output of said data bistable device to an input of said selective coupling means.

13. The combination in accordance with claim 11 in which said common circuit connection comprises first and second conductors, means apply the output of said selective coupling means to said conductors in double-rail logic format, means couple said first conductor to a setting input connection of each of said bistable switching devices for supplying signals to establish enabled ones of said devices in a second predetermined stable condition, means couple said second conductor to a resetting input connecting to each of said bistable switching devices for supplying signals to establish enabled ones of said devices in said first predetermined stable condition, said selective enabling means comprises means supplying control signals for enabling the last-mentioned first and second conductor coupling means of predetermined one or more of said devices, and said cell interconnecting gating means comprises first gating means coupling said first conductor to receive signals from a corresponding conductor in an adjacent cell to the left in said tandem sequence, and second gating means coupling said second conductor to receive signals from a corresponding conductor in an adjacent cell to the right in said tandem sequence.

14. The combination in accordance with claim 13 in which the first-mentioned coupling means comprises an OR logic gate receiving inputs from said sources, and EXCLUSIVE OR logic gate receiving as one input an output of said OR gate and receiving as a second input a binary control signal causing the output of said EXCLUSIVE OR gate to represent the output of said OR gate in true form or complement form depending on the state of said binary control signal, controllable gating means coupling the output of said EXCLUSIVE OR gate to said common connection in double-rail logic form comprising both a single-rail true output of such gate and single-rail complement output of such gate, said controllable gating means including separately controllable gates coupling said true and complement outputs to said first and second conductors, respectively means selectively partially enabling either the full double-rail form of said EXCLUSIVE OR gate output or either one of the constituent single-rail outputs thereof, and means coupling said selection means single output connection for simultaneously partially enabling all outputs of said gating means in the absence of said disabling signal.

15. The combination in accordance with claim 13 in which said cell interconnecting gating means comprises means permanently disabling said first gating means in the left-most one of said cells in said tandem sequence.

16. The combination in accordance with claim 1 which defines a distributed logic memory cell and with which a plurality of additional ones of such cells are provided, and control means provide said control signals and comprise a read-only memory containing in machine-usable format a predetermined sequence of program instructions representing plural control signal states for said cells, means accessing said program instruction words in a predetermined sequence for generating corresponding sequential sets of said control signals, and means coupling said sets of control signals to all of said cells in parallel.

17. The combination in accordance with claim 16 in which each of said instructions includes an information bit indicating whether or not such instruction is a branching instruction, each of said instructions further includes an address field for defining either a cell store bit location when said branching bit is in its first state, or at least a portion a read-only memory address location when said branching bit is in a second state, a cell read connection coupled to said common circuit connection of all of said cells, means responsive to coincidence of a predetermined signal condition on said read connection, with said second state of said branching bit, coupling signals in said address field to said accessing means.

18. The combination in accordance with claim 16 in which said control signal coupling means comprises a plurality of control signal busses, each coupled in parallel to all cells in a different group of said cells, and means coupling said sets of control signals in parallel to all of said busses.

19. The combination in accordance with claim 18 in which means are provided for coupling said common circuit connections to form a tandem sequence of such connections for all of said cells.

20. In combination, a plurality of bistable switching devices each having input means for controlling the operation thereof, a plurality of signal sources, means for supplying data signals in multiple to input means of all of said devices from a selectable one of said sources, means, in said input means, for selectively enabling at least one of said devices for actuation in response to said data signals, a plurality of circuits for providing different condition control signal combinations, each of said control signal combinations corresponding to a different one of said devices, and Selection means, responsive to coincidence of one of said condition control signal combinations and a predetermined stable state of one of said switching devices, for supplying a signal to disable the application of said data signals to said devices from said sources.

21. The combination in accordance with claim 20 in which said data signal supplying means comprises means for combining signals from two selectable ones of said sources in accordance with at least one predetermined logical function, and means for coupling said disabling signal to inhibit output from said combining means to said devices.

* * * * *

UNITED STATES PATENT OFFICE
CERTIFICATE OF CORRECTION

Patent No. 3,670,308 Dated June 13, 1972

Inventor(s) David M. Tutelman

It is certified that error appears in the above-identified patent and that said Letters Patent are hereby corrected as shown below:

In the drawings, Sheet 2, FIG. 4, delete the solder point at the intersection of leads 55 and 68. Col. 3, line 27, cancel "diagonal" and insert --branch--. Col. 5, line 36, cancel "4" and insert --3--. Col. 6, line 3, cancel "28" and insert --48--. Col. 10, line 44, cancel the first parenthesis and insert a comma; line 62, cancel "reset" and insert --set--. Col. 11, line 28, cancel "present" and insert --preset--. Col. 12, line 52, cancel "2." and insert --3.--; line 62, in the second column cancel "→M" and insert --→D--; line 65, cancel "M" and insert --D--; line 71, cancel "M" and insert --D--. Col. 13, line 65, in the second column cancel "D-" and insert --D→--. Col. 14, line 9, cancel "letter" and insert --latter--. Col. 16, line 35, cancel "in" and after "which" insert --defines a distributed logic memory cell and with which a plurality of additional ones of such cells are provided, and--. Col. 17, line 13, cancel "in" and after "which" insert --defines a distributed logic memory cell and with which a plurality of additional ones of such cells are provided, and--; line 14, cancel "a plurality of said cells are provided,"; line 19, after "cells," insert --and--.

Signed and sealed this 28th day of November 1972.

(SEAL)
Attest:

EDWARD M.FLETCHER,JR.
Attesting Officer

ROBERT GOTTSCHALK
Commissioner of Patents